United States Patent
Minear et al.

(10) Patent No.: US 9,876,763 B2
(45) Date of Patent: Jan. 23, 2018

(54) APPLICATION STATE SHARING IN A FIREWALL CLUSTER

(71) Applicant: McAfee, Inc., Santa Clara, CA (US)

(72) Inventors: Spencer Minear, Fridley, MN (US); Paul Meyer, White Bear Lake, MN (US)

(73) Assignee: McAfee, LLC, Santa Clara, CA (US)

( * ) Notice: Subject to any disclaimer, the term of this patent is extended or adjusted under 35 U.S.C. 154(b) by 241 days.

(21) Appl. No.: 14/299,551

(22) Filed: Jun. 9, 2014

(65) Prior Publication Data

US 2015/0082412 A1 Mar. 19, 2015

Related U.S. Application Data

(63) Continuation of application No. 13/227,825, filed on Sep. 8, 2011, now Pat. No. 8,763,106.

(51) Int. Cl.
| | |
|---|---|
| *G06F 9/00* | (2006.01) |
| *H04L 29/06* | (2006.01) |
| *H04L 12/18* | (2006.01) |
| *H04L 12/24* | (2006.01) |
| *H04W 4/00* | (2009.01) |

(52) U.S. Cl.
CPC .......... *H04L 63/02* (2013.01); *H04L 12/1813* (2013.01); *H04L 63/0218* (2013.01); *H04L 41/0668* (2013.01); *H04W 4/00* (2013.01)

(58) Field of Classification Search
CPC ..... H04L 12/24; H04L 12/4679; H04L 29/06; H04L 41/00; H04L 69/40; G09G 2354/00; G09G 2370/16; G09G 2370/22; G09G 5/006; G09G 5/14

USPC .......................................................... 726/11
See application file for complete search history.

(56) References Cited

U.S. PATENT DOCUMENTS

| | | | |
|---|---|---|---|
| 6,772,226 B1 | 8/2004 | Bommareddy et al. | |
| 6,880,089 B1 | 4/2005 | Bommareddy et al. | |
| 7,254,834 B2* | 8/2007 | Goddard | 726/11 |
| 7,266,715 B1 | 9/2007 | Bazzinotti et al. | |
| 7,447,901 B1 | 11/2008 | Sullenberger et al. | |
| 7,844,731 B1 | 11/2010 | Zhou | |
| 8,015,298 B2 | 9/2011 | Yevmenkin et al. | |
| 8,763,106 B2 | 6/2014 | Minear et al. | |

(Continued)

FOREIGN PATENT DOCUMENTS

| | | |
|---|---|---|
| CN | 200410070804.5 | 1/2006 |
| CN | 200910092642.8 | 2/2010 |

(Continued)

OTHER PUBLICATIONS

Non-Final Office Action received for U.S. Appl. No. 13/227,825, dated Nov. 8, 2012, 13 pages.

(Continued)

*Primary Examiner* — Kambiz Zand
*Assistant Examiner* — Abiy Getachew
(74) *Attorney, Agent, or Firm* — Blank Rome, LLP

(57) ABSTRACT

A firewall cluster system comprises a first node operable to receive a connection in a firewall cluster having three or more nodes, monitor packets of the received connection and determining application state data associated with the connection from the monitored packets in the first node, and share application state data with at least another node in the firewall cluster.

18 Claims, 3 Drawing Sheets

(56) References Cited

U.S. PATENT DOCUMENTS

| | | |
|---|---|---|
| 2003/0002494 A1 | 1/2003 | Kuukankorpi et al. |
| 2003/0018914 A1 | 1/2003 | Cheng et al. |
| 2005/0177869 A1 | 8/2005 | Savage et al. |
| 2005/0240989 A1 | 10/2005 | Km et al. |
| 2006/0013227 A1 | 1/2006 | Kannan |
| 2006/0075478 A1 | 4/2006 | Hyndman et al. |
| 2006/0143699 A1 | 6/2006 | Nagata et al. |
| 2006/0195896 A1 | 8/2006 | Fulp et al. |
| 2007/0180226 A1 | 8/2007 | Schory et al. |
| 2007/0180513 A1 | 8/2007 | Raz et al. |
| 2007/0294754 A1 | 12/2007 | Finkelstein et al. |
| 2008/0028456 A1 | 1/2008 | O'Rourke et al. |
| 2008/0098113 A1 | 4/2008 | Hansen et al. |
| 2008/0115205 A1 | 5/2008 | Aaron |
| 2008/0209044 A1 | 8/2008 | Forrester |
| 2009/0113051 A1 | 4/2009 | Franklin |
| 2011/0030049 A1 | 2/2011 | Adams et al. |
| 2012/0039231 A1 | 2/2012 | Suri et al. |
| 2012/0057591 A1* | 3/2012 | Erman et al. .............. 370/389 |
| 2012/0210416 A1 | 8/2012 | Mihelich et al. |
| 2013/0067557 A1 | 3/2013 | Allison et al. |
| 2013/0073743 A1 | 3/2013 | Ramasamy et al. |
| 2013/0152156 A1 | 6/2013 | Allison et al. |

FOREIGN PATENT DOCUMENTS

| | | |
|---|---|---|
| WO | 02/015514 A2 | 2/2002 |
| WO | 2008049094 | 4/2008 |
| WO | 2013/036646 A1 | 3/2013 |
| WO | 2013/036651 A1 | 3/2013 |
| WO | 2013/089935 A1 | 6/2013 |

OTHER PUBLICATIONS

Notice of Allowance received for U.S. Appl. No. 13/227,825, dated Feb. 14, 2014, 8 pages.
Non-Final Office Action received for U.S. Appl. No. 13/227,825, dated Sep. 12, 2013, 15 pages.
Final Office Action received for U.S. Appl. No. 13/227,825, dated May 28, 2013, 17 pages.
Final Office Action received for U.S. Appl. No. 13/227,848, dated Mar. 26, 2014, 20 pages.
Non-Final Office Action received for U.S. Appl. No. 13/227,848, dated Jan. 9, 2013, 15 pages.
Final Office Action received for U.S. Appl. No. 13/323,816, dated Jul. 12, 2013, 15 pages.
Non-Final Office Action received for U.S. Appl. No. 13/323,816, dated Jan. 31, 2013, 12 pages.
Cisco, "Cisco ASA 5500 Series Configuration Guide using the CLI", Cisco Systems, Inc. Copyright © 2011-2012, pp. 1994.
International Preliminary Report on Patentability and Written Opinion received for PCT Patent Application No. PCT / US2012/053971, dated Mar. 20, 2014, 6 pages.
International Search Report and Written Opinion received for PCT Patent Application No. PCT/US2012/053971, dated Jan. 23, 2013, 7 pages.
International Preliminary Report on Patentability and Written Opinion received for PCT Patent Application No. PCT/US2012/053976, dated Mar. 20, 2014, 6 pages.
International Search Report and Written Opinion received for PCT Patent Application No. PCT/US2012/053976, dated Jan. 25, 2013, 7 pages.
International Preliminary Report on Patentability and Written Opinion received for PCT Patent Application No. PCT/US2012/063249, dated Jun. 26, 2014, 8 pages.
International Search Report and Written Opinion received for PCT Patent Application No. PCT/US2012/063249, dated Dec. 27, 2012, 6 pages.
Petri, Daniel, "What are IPSEC Policies?", Petri IT Knowledge base, Jan. 8, 2009, 7 pages, also available at http://www.petri.co.il/what_are_ipsec_policies.htm.
Fan C C et al: "The Raincore Distributed Session Service for Networking Elements", Parallel and Distributed Processing Symposium, Proceedings 15th Inter National San Francisco, CA USA Apr. 23-27, 2001, Los Alamitos, CA, USA, IEEE Comput Soc, US, Apr. 23, 2001 (Apr. 23, 2001), pp. 1673-1681, XP010544581, ISBN: 978-0-7695-0990-7.
European search report received in corresponding European patent application No. 12829364.4 dated Apr. 13, 2015.

* cited by examiner

US 9,876,763 B2

APPLICATION STATE SHARING IN A FIREWALL CLUSTER

TECHNICAL FIELD

The invention relates generally to firewall operation, and more specifically in one embodiment to application state sharing in a firewall cluster.

LIMITED COPYRIGHT WAIVER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND ART

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses or Trojan horse programs may be distributed to other computers, or unknowingly downloaded or executed by large numbers of computer users. Further, computer users within an organization such as a corporation may on occasion attempt to perform unauthorized network communications, such as running file sharing programs or transmitting corporate secrets from within the corporation's network to the Internet.

For these and other reasons, many corporations, institutions, and even home users use a network firewall or similar device between their local network and the Internet. The firewall is typically a computerized network device that inspects network traffic that passes through it, permitting passage of desired network traffic based on a set of rules.

Firewalls perform their filtering functions by observing communication packets, such as TCP/IP or other network protocol packets, and examining characteristics such as the source and destination network addresses, what ports are being used, and the state or history of the connection. Some firewalls also examine packets traveling to or from a particular application, or act as a proxy device by processing and forwarding selected network requests between a protected user and external networked computers.

The firewall typically controls the flow of network information by monitoring connections between various ports, sockets, and protocols, such as by examining the network traffic in a firewall. Rules based on socket, port, application, and other information are used to selectively filter or pass data, and to log network activity. Firewall rules are typically configured to identify certain types of network traffic that are to be prohibited or that should have certain other restrictions applied, such as blocking traffic on ports known to be used for file sharing programs while virus scanning any received over a traditional FTP port, blocking certain applications or users from performing some tasks while allowing others to perform such tasks, and blocking traffic based on known attack patterns such as repeated queries to different ports from a common IP address.

But, the ability of a firewall to manage such connections when distributed across multiple computer systems is limited in that knowledge of a connection is typically stored only in the system handling the connection. Improved firewall distribution in a cluster is therefore desired.

SUMMARY

Various example embodiments of the invention comprise a firewall cluster system including a first node operable to receive a connection in a first node of a firewall cluster having three or more nodes, monitor packets of the received connection and determining application state data associated with the connection from the monitored packets in the first node, and share application state data with at least another node in the firewall cluster. Another node can use the application state data to continue processing the connection such as if the first node fails, or to provide load balancing.

DESCRIPTION OF EMBODIMENTS

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
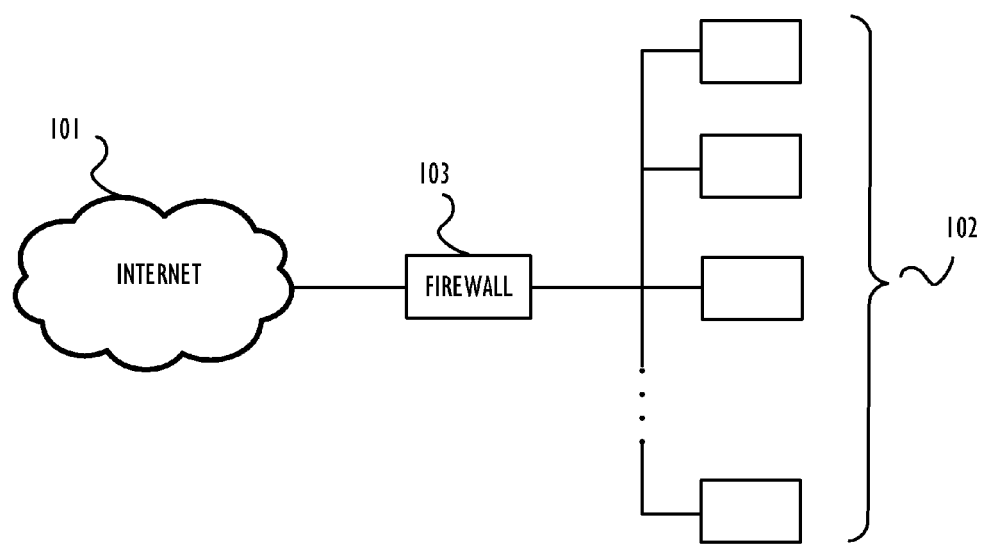
FIG. 1 shows an example network including a firewall, as may be used to practice some embodiments of the invention.

FIG. 1 illustrates a typical computer network environment, including a public network such as the Internet at 101, a private network 102, and a computer network device operable to provide firewall and intrusion protection functions shown at 103. In this particular example, the computer network device 103 is positioned between the Internet and the private network, and regulates the flow of traffic between the private network and the public network.

The network device 103 is in various embodiments a firewall device, and intrusion protection device, or functions as both. A firewall device or module within the network device provides various network flow control functions, such as inspecting network packets and dropping or rejecting network packets that meet a set of firewall filtering rules. As described previously, firewalls typically perform their filtering functions by observing communication packets, such as TCP/IP or other network protocol packets, and examining characteristics such as the source and destination network addresses, what ports are being used, and the state or history of the connection. Some firewalls also examine packets to determine what application has established the connection, or act as a proxy device by processing and forwarding selected network requests between a protected user and external networked computers. Firewalls often use "signatures" or other characteristics of undesired traffic to detect and block traffic that is deemed harmful or that is otherwise undesired.

Firewalls typically use sets of rules to filter traffic, such that what happens with any particular element of network data is dependent on how the rule set applies to that particular data. For example a rule blocking all traffic to port 6346 will block incoming traffic bound for that port on a server within the protected network, but will not block other data going to the same server on a different port number. Similarly, a rule blocking traffic originating from a file sharing program such as Shareaza will use patterns in the traffic to block Shareaza traffic on port 6346, but allow other traffic on port 6346.

But, in an environment where a firewall is implemented as a system distributed across multiple computers or nodes, such as in a large or complex system, the ability of multiple nodes to share a connection is limited by the managing node's information regarding the connection, such as socket information, application information, and the like regarding the connection. Some embodiments of the invention therefore provide a mechanism for sharing state information such as application type or other such connection data with other systems in a cluster firewall, enabling multiple nodes in the firewall cluster to process the same connection. This provides the cluster the ability to load balance by moving connection responsibility between systems, to manage failure of a node in the cluster by moving its connections to another machine, and to perform other such functions.

Figure 2:
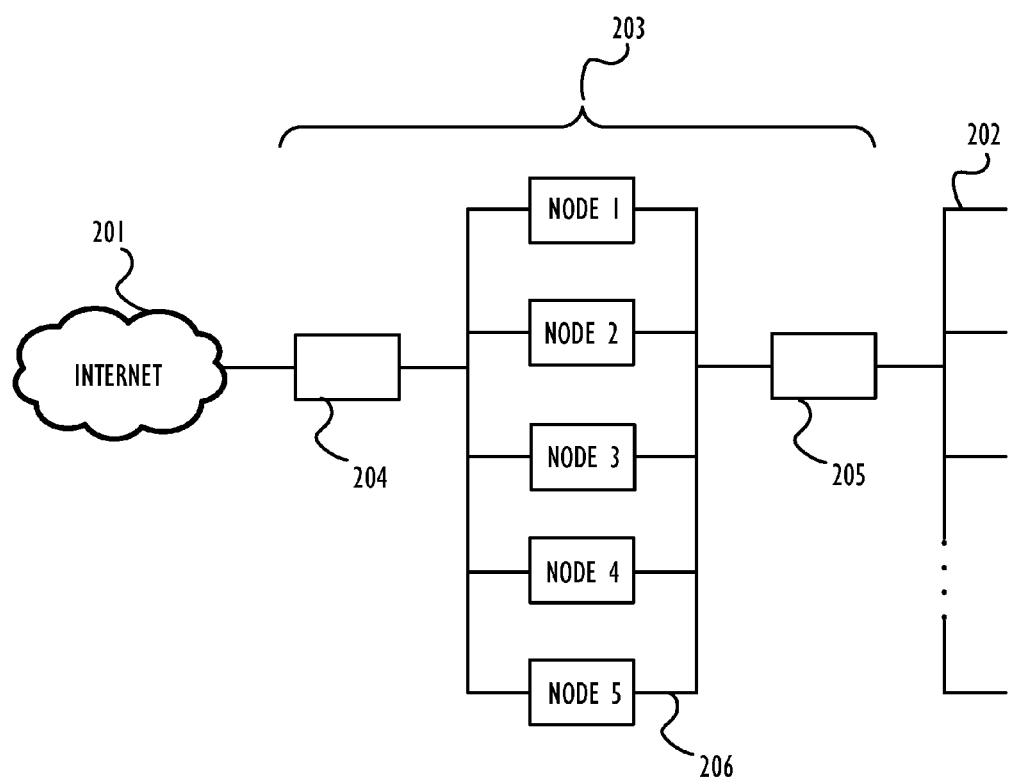
FIG. 2 shows an example network including a firewall cluster comprising multiple firewall nodes, as may be used to practice some embodiments of the invention.

In one such example, a firewall or intrusion protection system is implemented as a cluster or connected group of nodes that share processing traffic flowing through the firewall. FIG. 2 shows a network with a distributed firewall, as may be used to practice some embodiments of the invention. Here, a network such as the Internet 201 is coupled to an internal network 202 by a firewall, 203. The firewall 203 comprises an incoming traffic module 204 and an outgoing traffic module 205 that can perform functions such as load balancing and other firewall management functions. The firewall or intrusion protection rules are applied in firewall nodes 206, which are connected to one another by network connections as shown.

Here the five nodes shown each comprise a separate computer system running an instance of firewall or related software, operable to apply rules to traffic to selectively permit or block traffic flowing between the Internet 201 and the internal network 202. In an alternate embodiment, some nodes such as nodes 1, 2, and 3 execute a firewall application, while other nodes such as 4 and 5 execute an intrusion protection system (IPS) application. The nodes 204 and 205 are responsible for performing functions such as load balancing traffic routed to the firewall nodes 206, ensuring that the nodes are able to work together efficiently to provide higher throughput capability than a single node.

Some firewall embodiments perform complex connection identification functions that go beyond simple application of port, IP, and other such rules to a data stream. For example, some firewall examples include an application identification module that is operable to monitor the first several packets of a new connection, and to identify the application that has initiated the connection based on application communication profile information. Once the application is determined, application-specific rules can be applied to the connection, providing enhanced ability to control the data flowing through the firewall.

If a firewall node at 206 fails, another node can simply pick up the connection and apply the same traditional firewall rules based on port, IP address, and other such characteristics. But, although the five different firewall nodes at 206 in FIG. 2 can apply the same rules to a connection based on identifiable characteristics such as port and IP address, they cannot re-examine the first several packets of a link that is already established to apply application-based rules to the connection.

Some embodiments of the invention therefore provide a mechanism for application state sharing across nodes in a firewall cluster, enabling the firewall to move a connection subject to application-based rules to another node, such as for load balancing or to recover from a failed cluster node. This state sharing is in one embodiment handled via a network connection linking the nodes in the firewall cluster to one another, such as is shown in FIG. 2. Because session information for connections including application information is shared across nodes, the node receiving an established connection with an identified application can apply application-specific rules to either allow or deny traffic as determined by the firewall configuration.

The state sharing in some embodiments includes broadcasting state information to all the other nodes in the firewall cluster, such that the other nodes each have knowledge of the application state of connections on other nodes. In an alternate embodiment, a master node receives the application state data and stores the data, such that at least two nodes in the cluster have application state data for connections where application state data has been identified. The master node may therefore share its application state data with a backup master node or other designated node, so that failure of the master node will not result in loss of the application state data. In still other examples, a master node receives the application state information and then broadcasts the information to other nodes.

Figure 3:
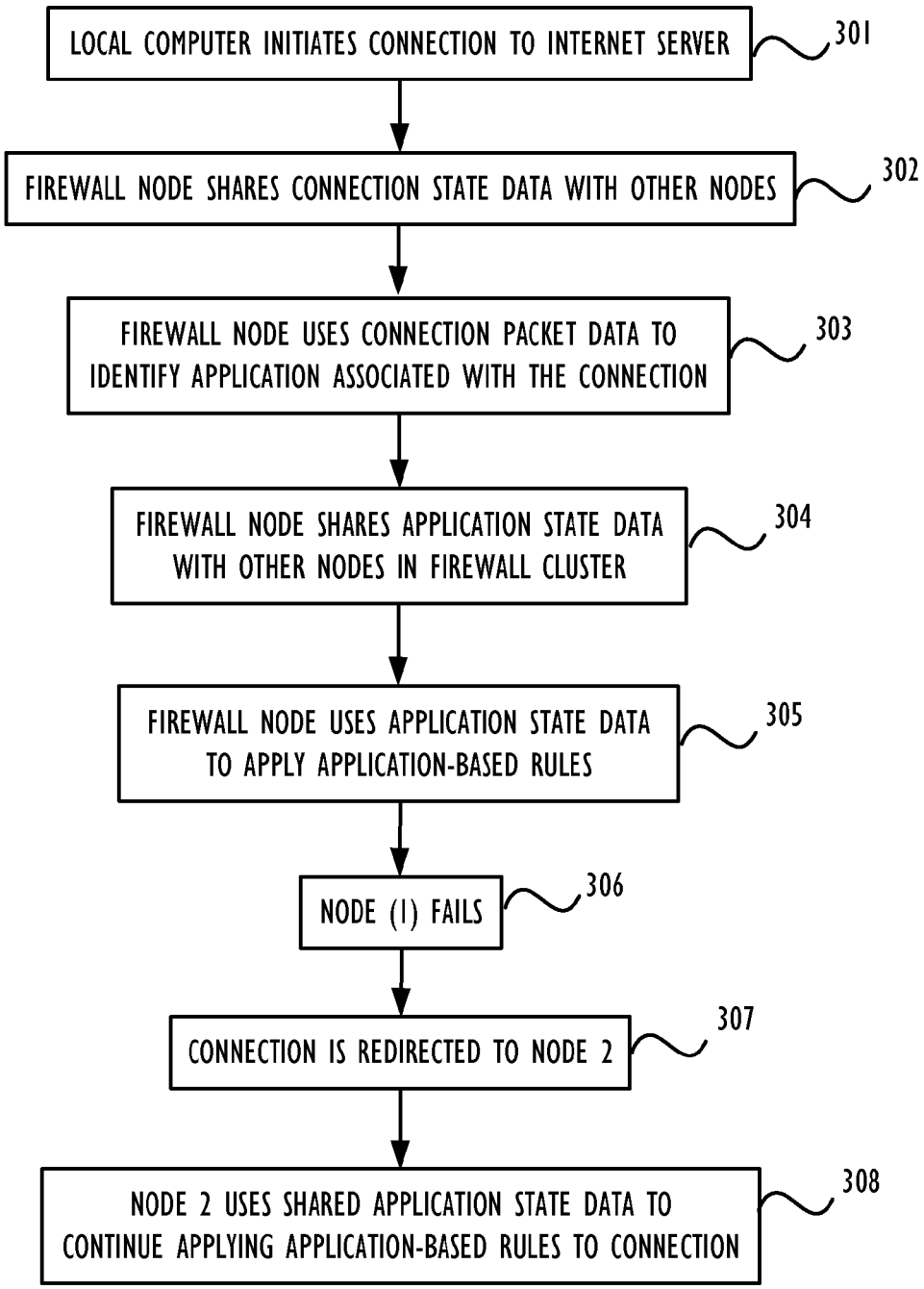
FIG. 3 is a flowchart illustrating a method of using shared application state data in a firewall cluster, consistent with an example embodiment of the invention.

FIG. 3 shows an example of using application state sharing across nodes in a firewall to recover from a failed node, consistent with an example embodiment of the invention. At 301, a link is initiated between a computer in local network 202 and the Internet 201. The link between nodes is handled by node 1, which shares state information such as source and destination port and IP address as soon as the network connection is established at 302. After several packets of data have been exchanged between the local computer and the Internet server, the firewall can compare data patterns in the packets against data patterns associated with known applications at 303, determining in many instances what application has initiated the connection. The firewall node 1 then shares this application state data for the connection with other nodes at 304, and uses the application state data to apply application-specific rules to the firewall at 305.

At 306, node 1 fails, and the connection is redirected to node 2 at 307. Because node 2 has received application state data regarding the connection from node 1 previously, node 2 is able to resume filtering the data stream including applying application-specific rules to the connection at 308.

Although this example illustrates how a node can resume filtering a connection after a node fails, similar methods can be employed to move connections from one node to another in a distributed firewall cluster for applications such as load balancing, or reassignment of nodes to different tasks.

In one such example, firewall node 1 does not fail, but an intrusion protection system node that is one of two such nodes (not pictured) fails. The system desires to maintain a certain balance between the number of nodes providing firewall service and the number of nodes providing intrusion protection, and in this example the intrusion protection system has lost half its capacity when one of its two nodes failed. The system therefore reassigns firewall node 1 to replace the failed intrusion protection node, resulting in connections previously handled by firewall node 1 being redistributed across firewall nodes 2-5, as shown in FIG. 2.

These examples illustrate how sharing application state data in a firewall cluster can facilitate load balancing, failover, and other functions within the firewall cluster, making application-based filtering of network traffic in a firewall cluster more manageable and reliable.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. One or more non-transitory computer readable media comprising computer executable instructions stored thereon that when executed cause one or more processors to:
process, by a first firewall node of a firewall cluster having three or more nodes, connection information associated with a packet;
establish a connection;
provide state data associated with the connection to a master node in the firewall cluster;
responsive to a failure of the first node, transfer the connection to a second firewall node of the cluster; and
provide the state data from the master node to the second firewall node.

2. The one or more non-transitory computer readable media of claim 1, wherein the instructions further comprise instructions that when executed cause one or more processors to:
broadcast the state data to other firewall nodes in the firewall cluster.

3. The one or more non-transitory computer readable media of claim 1, wherein the instructions further comprise instructions that when executed cause one or more processors to:
filter the connection in another node to provide load balancing in the firewall cluster.

4. The one or more non-transitory computer readable media of claim 1, wherein the instructions further comprise instructions that when executed cause one or more processors to:
provide application state data to the master node; and
provide the application state data to the second firewall node responsive to a failure of the first firewall node.

5. A method, comprising:
processing, by a first firewall node of a firewall cluster having three or more nodes, connection information associated with a packet;
establishing a connection;
providing state data associated with the connection to a master node in the firewall cluster;
transferring the connection to a second firewall node of the cluster, responsive to a failure of the first firewall node; and
providing the state data from the master node to the second firewall node.

6. The method of claim 5, further comprising:
broadcasting the state data to other firewall nodes in the firewall cluster.

7. The method of claim 5, further comprising:
filtering the connection in another node to provide load balancing in the firewall cluster.

8. The method of claim 5, further comprising:
providing application state data to the master node; and
providing the application state data to the second firewall node responsive to a failure of the first firewall node.

9. A firewall cluster having three or more nodes, comprising:
a plurality of processors, wherein each node of the firewall cluster is configured to execute on one or more of the plurality of processors; and
a memory communicatively coupled to one or more of the plurality of processors,
wherein a first firewall node of the firewall cluster is operable to:
process connection information associated with a packet;
establish a connection; and
provide state data associated with the connection to a master node of the firewall cluster; and
wherein the master node is operable to:
transfer the connection from the first firewall node to a second firewall node of the firewall cluster responsive to a failure of the first firewall node; and
provide the state data to the second firewall node.

10. The firewall cluster of claim 9, wherein the first firewall node is further operable to broadcast the state data to other firewall nodes in the firewall cluster.

11. The firewall cluster of claim 9, wherein the master node is operable to broadcast the state data to other firewall nodes in the firewall cluster.

12. The firewall cluster of claim 9, wherein the master node is further operable to filter the connection in another node to provide load balancing in the firewall cluster.

13. The firewall cluster of claim 9,
wherein the first firewall node is further operable to provide application state data to the master node, and
wherein the master node is further operable to provide the application state data to the second firewall node responsive to the failure of the first firewall node.

14. A node of a firewall cluster having three or more modes, comprising:
one or more processors;

a memory, on which are stored instructions, on which are stored instructions, comprising instructions that when executed cause one or more processors to:
  receive state data associated with a connection established by a first firewall node of the firewall cluster;
  store the state data;
  transfer the connection from the first firewall node to a second firewall node of the firewall cluster responsive to a failure of the first firewall node; and
  provide the state data to the second firewall node.

15. The node of claim 14, wherein the instructions further comprise instructions that when executed cause one or more processors to:
  broadcast the state data to other firewall nodes in the firewall cluster.

16. The node of claim 14, wherein the instructions further comprise instructions that when executed cause one or more processors to:
  provide the state data to a backup master node of the firewall cluster.

17. The node of claim 14, wherein the instructions further comprise instructions that when executed cause one or more processors to:
  filter the connection in another node to provide load balancing in the firewall cluster.

18. The node of claim 14, wherein the instruction further comprise instructions that when executed cause one or more processors to:
  receive application state data from the first firewall node; and
  provide the application state data to the second firewall node responsive to a failure of the first firewall node.

* * * * *